US007117018B2

(12) United States Patent
Lewis

(10) Patent No.: US 7,117,018 B2
(45) Date of Patent: Oct. 3, 2006

(54) ARRAY BEAMFORMING WITH WIDE NULLS

(75) Inventor: Michael E. Lewis, Hartville, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/287,925

(22) Filed: Nov. 28, 2005

(65) Prior Publication Data

US 2006/0079289 A1 Apr. 13, 2006

Related U.S. Application Data

(63) Continuation of application No. 10/225,948, filed on Aug. 22, 2002, now Pat. No. 6,970,722.

(51) Int. Cl.
*H04M 1/00* (2006.01)

(52) U.S. Cl. ................. 455/562.1; 455/13.3; 455/63.4; 455/272; 455/273; 455/276.1; 342/378

(58) Field of Classification Search ............. 455/562.1, 455/107–108, 272, 507, 269–278.1, 280, 455/575.7, 550.1, 101, 102–103, 110–113, 455/13.3, 9–10, 63.4, 65, 18–25, 13.1; 342/372, 342/378–380, 381, 383, 324; 370/332, 342
See application file for complete search history.

(56) References Cited

U.S. PATENT DOCUMENTS

| | | | | |
|---|---|---|---|---|
| 5,579,016 | A * | 11/1996 | Wolcott et al. | 342/378 |
| 6,064,338 | A * | 5/2000 | Kobayakawa et al. | 342/378 |
| 6,166,689 | A * | 12/2000 | Dickey et al. | 342/381 |
| 6,166,690 | A * | 12/2000 | Lin et al. | 342/383 |
| 6,211,841 | B1 * | 4/2001 | Smith et al. | 343/813 |
| 6,392,596 | B1 * | 5/2002 | Lin et al. | 342/378 |
| 6,531,957 | B1 * | 3/2003 | Nysen | 340/10.1 |
| 6,600,446 | B1 * | 7/2003 | Moch | 342/373 |
| 6,697,009 | B1 * | 2/2004 | Yu | 342/17 |
| 6,768,444 | B1 * | 7/2004 | Langsford | 342/17 |
| 6,828,935 | B1 * | 12/2004 | Dunn et al. | 342/375 |
| 6,839,574 | B1 * | 1/2005 | Petrus et al. | 455/562.1 |
| 7,012,556 | B1 * | 3/2006 | Dean et al. | 341/155 |
| 2002/0013164 | A1 * | 1/2002 | Leifer et al. | 455/562 |
| 2002/0061768 | A1 * | 5/2002 | Liang et al. | 455/561 |
| 2003/0011516 | A1 * | 1/2003 | Moch | 342/377 |
| 2003/0058153 | A1 * | 3/2003 | Yu | 342/17 |
| 2003/0184473 | A1 * | 10/2003 | Yu | 342/380 |
| 2004/0131038 | A1 * | 7/2004 | Kim et al. | 370/342 |
| 2005/0195103 | A1 * | 9/2005 | Davis et al. | 342/99 |
| 2006/0023653 | A1 * | 2/2006 | Montalbano | 370/315 |
| 2006/0052138 | A1 * | 3/2006 | Reilly et al. | 455/561 |

* cited by examiner

*Primary Examiner*—Pablo N. Tran
(74) *Attorney, Agent, or Firm*—Tucker Ellis & West LLP

(57) ABSTRACT

A method and implementation of wireless communication are disclosed in which wireless signals are exchanged between at least one remote client and a directional antenna array associated with a wireless network, wherein the directional antenna array includes a plurality of antenna elements. A statistical matrix analysis is performed for each of the at least one client and the antenna array, in order to locate angles associated with directions of each client with respect to the antenna array. Values are determined for weighting factors for RF signals of each of the respective plurality of antenna elements, so as to create predetermined phase differences between the signals of the plurality of antenna elements. The predetermined phase differences are used to direct at least one null toward at least one source of interference, so as to avoid signal interference.

17 Claims, 2 Drawing Sheets

ARRAY BEAMFORMING WITH WIDE NULLS

CROSS REFERENCE TO RELATED APPLICATIONS

This application is a continuation of U.S. patent application Ser. No. 10/225,948 filed Aug. 22, 2002, now U.S. Pat. No. 6,970,722.

BACKGROUND OF THE INVENTION

The present invention is directed to the field of beamforming, particularly as used with an adaptive antenna array for a wireless telecommunications system, e.g. a wireless local area network (WLAN). In previous-type WLAN systems, it had been sufficient to communicate with wireless clients using one or more omnidirectional antennas. In such a previous-type scheme, wireless clients gain access to the WLAN by operating on different frequency bands and/or time-sharing over the same set of frequency bands.

As the number of clients in a WLAN increases, with resulting increased demands for WLAN access, it becomes necessary to "manage space," i.e. spatially isolate communications between clients distributed over a geographic area. To this end, it has become common to employ a directional antenna that can be selectively pointed at clients to allow isolated communications between the clients and the WLAN.

A common implementation for a directional antenna is to use an adaptive array. Such arrays can be formed of any grouping of antenna elements, such as a dipole, Yagi and patch antennas. These arrays can be one-dimensional, i.e. having linearly-distributed antenna elements. The array can also be two-dimensional, i.e. spread over an area, or three dimensional, i.e. distributed within a volume. Another common type of antenna is a printed array formed by lithographic techniques.

As the number of clients in a network continues to increase, it becomes increasingly hard to avoid interference between wireless clients, even when using an adaptive antenna array. Also, multipath interference can result from reflections and/or diffraction of the client' signal off metal within the building in which the WLAN operates. For reducing interference, it is possible to provide a narrow beam that can be steered toward a desired client using an array. Alternatively, it is possible to steer a "null" toward a potential interference source, where a "null" is an angular distribution in the array antenna pattern of very low gain signal strength.

In practice, it is difficult and expensive to form a narrow beam, requiring adaptive arrays with more elements and a high level of precise calibration. However, such arrays are undesirably expensive, due to the level of testing and calibration. Also, with potential sales volumes of several hundred thousand antenna arrays per year, such handling slows down production in addition to adding to the expense, thereby further reducing production efficiency.

Without calibration and testing, presently available lithographic techniques allow the construction of printed arrays having great precision, having a tolerance of +/−0.003". An error of 0.005" in a printed array has been found to produce a small wavelength error of only 0.2% at the 5.0 GHz band. Thus, an array as manufactured would have very desirable performance, except for the expense accounted in testing and calibration.

SUMMARY OF THE INVENTION

The difficulties and drawbacks of previous type schemes are resolved by the method and implementation of wireless communication according to the present invention in which wireless signals are exchanged between at least one remote client and a directional antenna array associated with a wireless network and located at an access point (AP), wherein the directional antenna array includes a plurality of antenna elements. A statistical matrix analysis is performed for each of the at least one client and the antenna array, in order to locate angles associated with directions of each client with respect to the antenna array using either MUSIC, ESPRIT or some other suitable method. Values are determined for weighting factors for RF signals of each of the respective plurality of antenna elements, so as to create predetermined phase differences between the signals of the plurality of antenna elements. The predetermined phase differences are used to direct at least one null toward at least one source of interference, so as to avoid signal interference. (These same weights are used to steer a wide angle, low precision, beam as well.)

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

In the present invention, signal interference is avoided by the method and implementation of the present invention by steering wide, deep nulls in the direction of interference, e.g. multipath sources or interfering clients and steering rudimentary beams in the desired directions. By creating wide nulls and beams with the present invention, normal manufacturing methods suffice and the positional error of the array can be accommodated, and an uncalibrated antenna array can be employed. In this way, the expensive and time consuming steps of array calibration and testing can be eliminated, thereby considerably reducing expense and increasing efficiency.

The present invention uses a novel technique of subspace beamforming and wide-null forming using the nominal array manifold to compute suitable weighting factors, for the antenna elements in a steerable, directional antenna array. The present invention can be used with a one-dimensional linear array, or with a two-dimensional or three-dimensional array of arbitrary topology.

Figure 1:
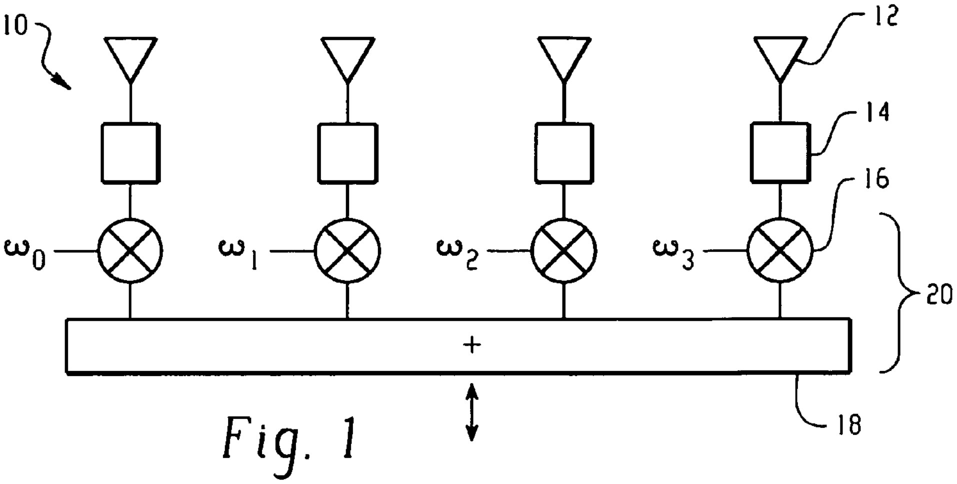
FIG. 1 depicts an exemplary directional antenna array.

As shown in FIG. 1, an antenna array 10 includes a plurality of antenna elements 12 for sending and receiving wireless signals. Each antenna includes an RF converter 14 for converting between baseband electrical signals and radio frequency (RF) wireless signals. Each digital baseband signal is preferably processed using quadrature signals. With quadrature, digital data in the baseband the signal is modulated in two distinct channels (I and Q channels). The I and Q channels are each modulated on carriers of the same frequency, one varying as the cosine and the other varying as the sine of the frequency, so that the channels are 90 degrees out of phase with each other and thus will not interfere. In this way, the baseband signal S is a "symbol," i.e. a complex signal having components $d_1$ and $d_2$ such that:

$$S=d_1+jd_2,\text{ where } j=\sqrt{-1}$$

$$S=d_1+jd_2$$

where $j=\sqrt{-1}$ and $d_1$ and $d_2$ are the baseband data streams for the I and Q channel respectively. Each of the antenna elements 12 include a multiplier 16 for applying a weighting factor $\omega_0$, $\omega_1$, $\omega_2$, $\omega_3$, etc. to the outgoing or ingoing RF signal during broadcast mode. The weights $\omega_0$ through $\omega_3$ are complex and are used to create phase differences in the signal, as will be explained in greater detail below. An adder/splitter 18 is used to multiplex the incoming RF signals from the antennas 12, so as to forward the signals to the network. From the adder/splitter 18, the signals are directed to the PHY layer, also known as the baseband processor, which takes the "symbols" from the antenna array 10 and converts them to bits that can be processed by the network. In broadcast mode, the adder/splitter 18 simply sends the signal from the PHY to each of the multipliers or each respective antenna. The adder/splitter 18 and the multipliers 16 in combination constitute a beamformer 20 for the antenna array 10. It is understood that, while only four antenna elements are depicted in FIG. 1, any number can be employed without departing from the invention. (Any modulation method can be used as long as one can generate a quadrature signal.) In the process of the present invention, it is necessary to perform a statistical matrix analysis for each client associated with the antenna array 10. As will be made clear below, the matrix analysis will be used in order to locate beams and nulls associated with the direction of each client with respect to the coordinate system of the antenna array 10. In this way, the present invention will determine the values for the array weights used in the beamformer, to create phase differences that allow the steering of nulls towards interference sources and beams towards the desired clients.

Figure 2A:
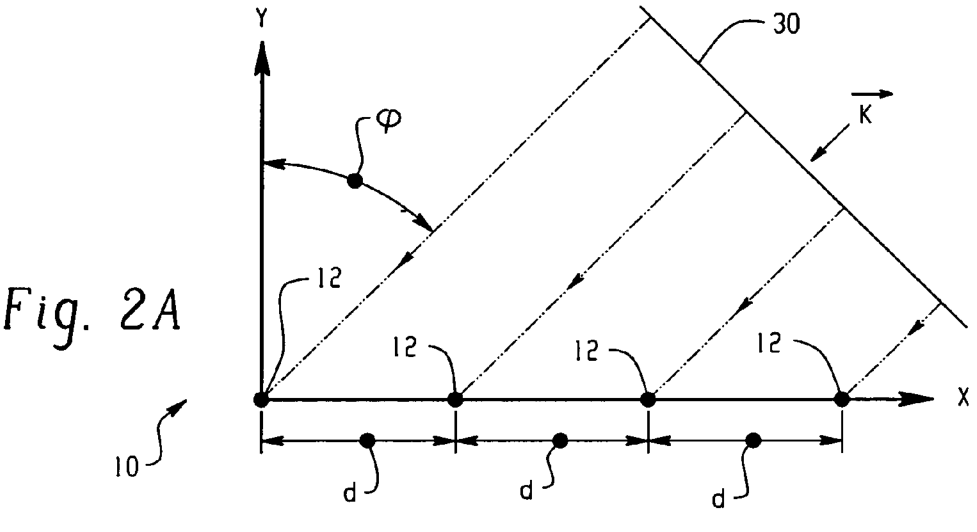
FIGS. 2A and 2B respectively illustrate signal reception and broadcasting as performed with an exemplary directional antenna array.

FIG. 2A depicts the antenna array 10 with the antenna elements 12 receiving a signal from a client. The client is at a sufficient distance from the array 10 that the signal wavefront can be approximated as a plane wave. For simplicity, the antenna array 10 is shown only in a two-dimensional X-Y plane, though a generalization in a three-dimensional coordinate system can easily be arrived at using the known formulae for depicting electromagnetic propagation. The measured signal strength E at each antenna element is expressed as:

$$\vec{E}=\vec{E}_0 e^{-i(\omega t-\vec{k}\cdot\vec{r})}$$

where $\vec{r}$ is the observation point (i.e. antenna location) for measuring the field and $\vec{k}$ is the propagation direction of the wavefront, and $\vec{k}\cdot\vec{r}$ is the phase of the measure signal determined by the observation point. The antenna elements 12 are taken to lie along the x-axis of our coordinate system and the array is assumed to be a uniform linear array, so that the signal phase is:

$$\vec{k}\cdot\vec{r}=\frac{2\pi}{\lambda}\times\cos(\varphi)$$

where λ is the wavelength of the client frequency f such that λ=c/f where c is the speed of light, and ϕ is the angle of incidence of the signal wavefront.

Each antenna element 12 is separated from each other by a distance d where an element 12 is located at the origin (x=0). Thus, each antenna element 12 will have a phase difference of signal reception such that:

$$\text{for } x=0,\ \vec{k}\cdot\vec{r}=0;$$

$$\text{for } x=d,\ \vec{k}\cdot\vec{r}=\frac{2\pi d}{\lambda}\cos(\varphi);$$

$$\text{for } x=2d,\ \vec{k}\cdot\vec{r}=\frac{4\pi d}{\lambda}\cos(\varphi);$$

$$\text{for } x=nd,\ \vec{k}\cdot\vec{r}=\frac{n2\pi d}{\lambda}\cos(\varphi);$$

so that the total received signal strength for an n-element array 10 would be:

$$E_n \propto 1+e^{-i\frac{2\pi d}{\lambda}\cos\varphi}+e^{-i\frac{4\pi d}{\lambda}\cos\varphi}+\ldots+e^{-i\frac{2n\pi d}{\lambda}\cos\varphi}$$

Another way of expressing these phases is by defining a new vector called the array manifold defined as $$a(\varphi)=\left(1,\ e^{-i\frac{2\pi d}{\lambda}\cos\varphi},\ e^{-i\frac{4\pi d}{\lambda}\cos\varphi},\ \ldots,\ e^{-i\frac{2n\pi d}{\lambda}\cos\varphi}\right).$$

Figure 2B:
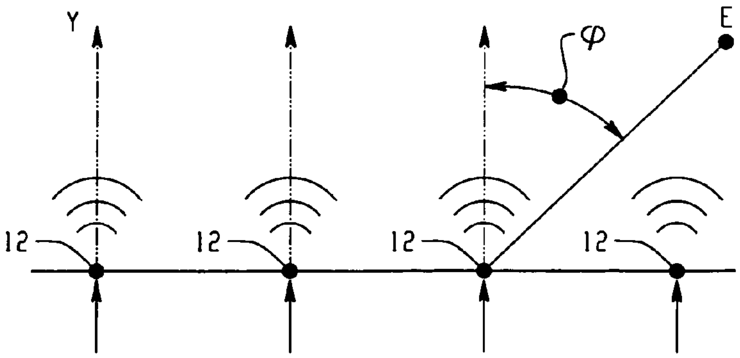
Figure 3A:
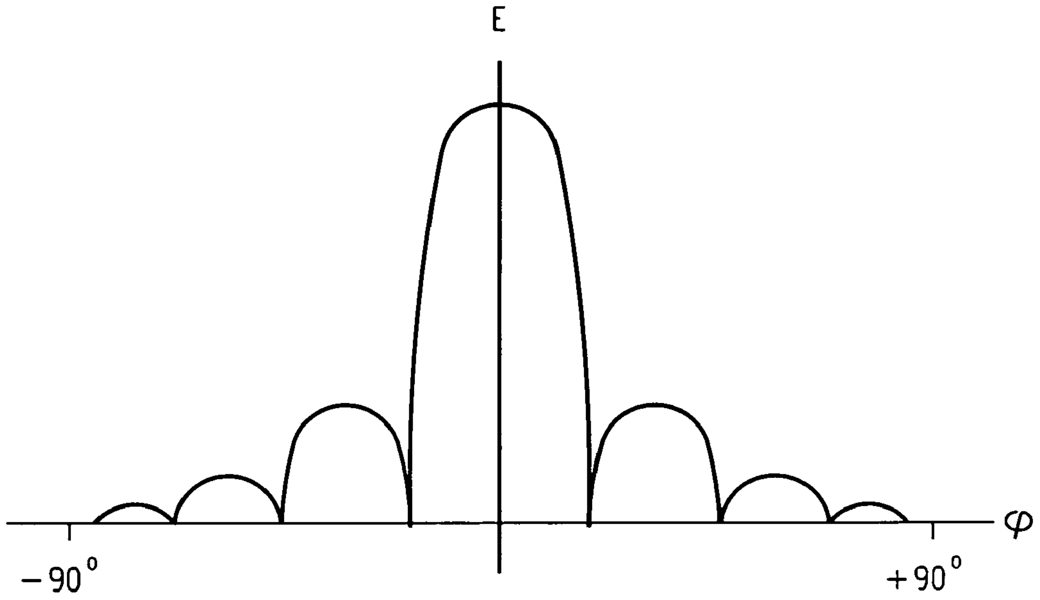
FIGS. 3A and 3B respectively illustrate the signal strength distributions for a directional antenna in a perpendicular direction and steered at an angle of 60 degrees.

When the array is used in transmission, as shown in FIG. 2B, each antenna element 12 is radiating in all directions in the X-Y plane. However, the phase differences between each element 12 are such that the received signal strength E located at an angle ϕ is the same as $E_n$ shown above. FIG. 3A shows the radiation pattern for the antenna array 10 corresponding to the above conditions, where the electric field strength is maximum along the axis (ϕ=O) and approaches zero for ϕ=+/−90°.

Figure 3B:
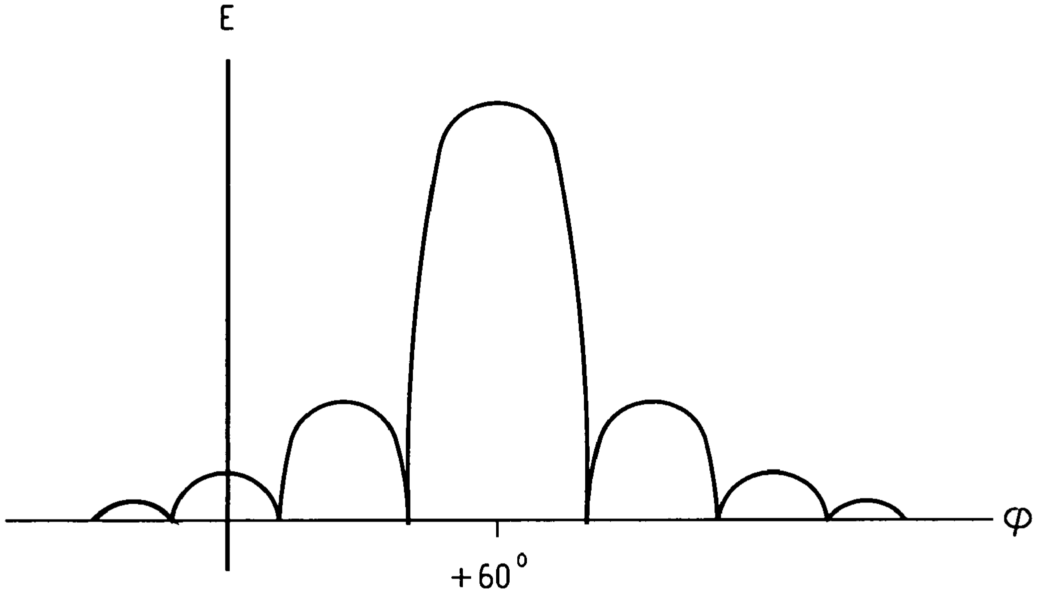

In order to transmit a signal toward a client located off-axis, e.g. 60°, it is necessary to adjust the phases of the antenna elements 10 so as to produce a signal maximum centered along ϕ=60°, as shown in FIG. 3B. This is accomplished by using the multipliers 16 to apply suitable weighting factors $\omega_0$, $\omega_1$, $\omega_2$, . . . $\omega_n$ to each antenna element 12 in an n-element array 10. This changes the phases of the RF signals transmitted from each antenna element to produce a signal E' such that:

$$E'=\omega_0 e^{-i0}+\omega_1 e^{-idcos\varphi}+\ldots+\omega_n e^{-indcos\varphi}$$

$$\text{or } E'=\sum_{0}^{n}\omega_n e^{-idcos\varphi}$$

In order to steer wide, deep nulls toward interference sources, it is necessary to determine weighting factors $\omega_n$ such that the radiation distribution is negligible in the direction of interference sources. The first step in the process is to sample the complex baseband signals from each antenna element 12 in the array 12, so as to obtain "snapshots" of signals from a particular client. This can be done during the initial association of the client to the access point or during subsequent communications with the access point. The sampled signals X for a three element array are expressed in vector form as follows:

$$X^T=\{x_0,x_1,x_3\}.$$

The sampled signals are used to build up a "covariance matrix" R such that:

$$R=XX^H$$

i.e., R is the direct product of X and $X^H$, the Hermitian transpose of vector X. For a matrix the Hermitian tranpose is obtained by taking the transpose of the matrix followed by the complex conjugation of each element in the matrix. In the case of a vector, the original vector, if a column vector, is changed into a row vector followed by a complex conjugation of each element in the vector. In the case of a row vector, the transpose results into a column vector. For the purpose of our discussion a non-transposed vector is assumed to be a column vector. In this way, for a three-element antenna array, the covariance matrix is a 3×3 matrix such that:

$$\begin{matrix} x_0x_0^* & x_0x_1^* & x_0x_2^* \\ x_1x_0^* & x_1x_1^* & x_1x_2^* \\ x_2x_0^* & x_2x_1^* & x_2x_2^* \end{matrix}$$

where the values in this matrix and all either auto-correlations or cross-correlations. The covariance matrix R is itself Hermitian, i.e., $R=R^H$, which is to say, if we take the Hermitian transpose of R, we get R back again.

Upon building up the covariance matrix of sampled values from the client signal, the covariance matrix undergoes an "eigen-decomposition" for determining eigenvalues and eigenvectors of the covariance matrix. The equation used for this is given by $$RV_i=\lambda_i V_i$$

where $V_i$ is the i'th eigenvector, R is the covariance matrix and $\lambda_i$ is the i'th eigenvalue. Of course, it is appreciated that there are as many eigenvalues i as there are rows or columns in the matrix, i.e. for an n×n matrix, there are n eigenvalues.

After the eigen-decomposition is performed, the eigenvalues and eigenvectors are recorded into a table. These eigenvectors are used as weights to produce the steering vector for forming the beam in the direction of the client. Note that one or more eigenvectors corresponding to the largest eigenvalues are used to build the steering vector. In the preferred embodiment, we may assume that the propagation path is reciprocal, and, the same eigenvectors can be used to transmit and receive messages. The array weights, i.e. dominant eigenvectors, recorded in the table are used by the beamformer 20 to steer the energy of the beam. Since the steering only requires calculating the dominant eigenvectors corresponding to the largest eigenvalues, the step of eigen-decomposition is rapid, if one simply calculates the largest eigenvalues and eigenvectors. Thus, it is not necessary to calculate the full eigen-decomposition.

After computing eigenvalues, it is necessary to determine the direction of arrival of the client signal. Several approaches are known for calculating the direction of arrival, and any could be contemplated without departing from the invention. For example, in one aspect, the array radiation pattern is computed for the dominant eigenvector used as array weights and the signal peak is searched for as a function of angle. In the preferred embodiment, a complimentary projection operator is built from the computed eigenvector. An incident angle is then found corresponding to the maximum distance from the "subspace" defined by the dominant eigenvector and the "array manifold" defined by the separations of antenna elements in the antenna array.

The dominant eigenvector V is used to generate a matrix A such that:

$$A=VV^H$$

A "projection operator" P for A is found such that:

$$P=AA^H$$

which when operating on a general vector projects the vector onto the column space of the matrix A. The complimentary projection operator P' is given as:

$$P'=I-P$$

where I is the identity matrix. In this way, the complementary projection operation P', when operating on a general vector, projects the vector onto a space perpendicular to the column space of A. When the projection operator operates on the array manifold the resulting vector will have a maximum when the angle used to compute the array manifold is equal to the angle of incidence. When the complementary projection operator is used there will be a minimum at the angle of incidence. In this way, the incident angle of the client signal can be derived. The computed angle and the eigenvectors constitute the "spatial signature" for the client. These values are saved by the access point to assist in the forming of the steering vectors and determine which clients can access the channel at the same time.

In an alternative embodiment, Capon's method, MUSIC and ESPRIT, etc. could also be used to compute the angle of incidence.

The access point housing the array 10 evaluates the spatial signatures and forms nulls in the steering vectors, so that the nulls can be directed toward any nearby clients or other potentially interfering sources. If two or more clients have adequate angular separation from the position of the antenna array 10 as indicated by their spatial signatures, the access point will compute suitable array steering vectors for each client. These steering vectors will then be used for both transmission and reception of messages from each respective client. The nulls are formed by computing an integrated direct product of the array manifold over the angular range needed to control interference, such that:

$$D=\int_{\theta_1}^{\theta_2} A(\varphi)A^T(\varphi)\,d\varphi$$

where $\theta_1$ and $\theta_2$ represents the width of the null, e.g. from 40 degrees to 60 degrees. This matrix D is then diagonalized and the eigenvectors used to form a complementary projection operator for the column space spanned of the original integrated matrix formed by the direct product of the array manifold. This complementary projection operator is applied to the steering vector for the client and results in a new steering vector that produces a wide null in the array pattern at the desired position.

The present invention offers simplicity in operating and permits the use of uncalibrated arrays, resulting in reduced manufacturing steps, thereby improving efficiency. Also, by steering nulls, performance is greatly improved. In these ways, the invention offers substantial savings with increased performance.

As described hereinabove, the present invention provides improvements in efficiency and performance over previous type methods and implementations. However, it will be appreciated that various changes in the details, materials and arrangements of parts which have been herein described and illustrated in order to explain the nature of the invention may be made by those skilled in the area within the principle and scope of the invention will be expressed in the appended claims.

The invention claimed is:

1. A wireless communication system, comprising:

a plurality of antennas forming a directional antenna array; and a beamformer coupled to the plurality of antennas, the beamformer comprising a plurality of multipliers, wherein each of the plurality of antennas has an associated multiplier from the plurality of multipliers, each multiplier responsive to receiving a signal from the associated antenna and multiplying the signal by a weighting factor, and an adder/splitter coupled to the plurality of multipliers, the adder/splitter configured to add the multiplied signals received from the plurality of multipliers and to split signals sent to the plurality of multipliers;

wherein the wireless communication receiving system is responsive to exchanging wireless signals between at least one remote client;

wherein the wireless communication system is responsive to exchanging wireless signals between the at least one remote client to locating angles associated with directions of arrival for wireless signals from the client with respect to each of the antenna array plurality of antennas;

wherein the wireless communication system is responsive to locating angles associated with directions of arrival to determining values for the weighting factors for the plurality of multipliers, so as to create predetermined phase differences between the signals of the plurality of antenna elements, wherein the determining values for the weighting factors comprises sampling baseband signals from each antenna element, so as to obtain a representation of sampled signals from a particular client;

wherein the wireless communication is configured to using the predetermined phase differences to direct at least one null toward at least one source of interference, so as to avoid signal interference;

wherein the wireless communication system is configured to use the sampled signals to build up a covariance matrix R; and wherein the sampled signals X have vector components $x_0, x_1, x_2 \ldots x_n$ that are expressed in matrix form such that $X=\{x_0\ x_1\ x_2 \ldots x_n\}$, and wherein the wireless communication system is configured so that the covariance matrix R is built up such that $R=XX^H$ where R is the direct product of X, and $X^H$ is the Hermitian matrix of X.

2. The wireless communication system of claim 1 wherein the directional antenna array used for exchanging wireless signals with the at least one client has antenna elements distributed to form one of a one-dimensional linear array, a two-dimensional array and three-dimensional array.

3. The wireless communication system of claim 1 wherein the plurality of antenna elements further comprise a radio frequency converter.

4. The wireless of claim 1 wherein the wireless communication system is configured to perform sampling at least one of the group consisting of the initial association of the client and during subsequent communications with the access point.

5. A wireless communication system, comprising:

a plurality of antennas forming a directional antenna array; and a beamformer coupled to the plurality of antennas, the beamformer comprising a plurality of multipliers, wherein each of the plurality of antennas has an associated multiplier from the plurality of multipliers, each multiplier responsive to receiving a signal from the associated antenna and multiplying the signal by a weighting factor, and an adder/splitter coupled to the plurality of multipliers, the adder/splitter configured to add the multiplied signals received from the plurality of multipliers and to split signals sent to the plurality of multipliers;

wherein the wireless communication system is configured to exchanging wireless signals between at least one remote client and the directional antenna array;

wherein the wireless communication system is responsive to exchanging wireless signals between the at least one remote client and the directional antenna array to locating angles associated with directions of arrival for wireless signals from the at least one remote client with respect to the antenna array;

wherein the wireless communication system is responsive to locating angles with the at least one remote client to determining values for the weighting factors for the multipliers for each of the plurality of antenna elements, so as to create predetermined phase differences between the signals of the plurality of antenna elements, wherein the determining values for the weighting factors comprises sampling baseband signals from each antenna element, so as to obtain a representation of sampled signals from a particular client, wherein the sampled signals are used to build up a covariance matrix R;

wherein the wireless communication system is configured to performing an eigen-decomposition upon the covariance matrix for determining the dominant eigenvalues and the corresponding eigenvectors of the matrix upon building up the covariance matrix of sampled values from the client signal; and wherein the wireless communication system is configured to using the predetermined phase differences to direct at least one null toward at least one source of interference, so as to avoid signal interference; and wherein the sampled signals X have vector components $x_0, x_1, x_2 \ldots x_n$ that are expressed in matrix form such that $X=\{x_0\ x_1\ x_2 \ldots x_n\}$, and wherein the wireless communication system is configured so that the covariance matrix R is built up such that $R=XX^H$ where R is the direct product of X, and $X^H$ is the Hermitian matrix of X.

6. The system of claim 5 wherein the wireless communication system is responsive to determine the eigen-decomposition is satisfied if the product of the covariance matrix R and the eigenvector is equal to the product of the scalar eigenvalue and the eigenvector such that $RV_i=\lambda_i V_i$, where $V_i$ is the eigenvector and $\lambda_i$ is the eigenvalues.

7. The system of claim 5 wherein, the wireless communication system is configured to record the dominant eigenvalue and its respective corresponding eigenvector into a table such that the eigenvectors are used as the weighting factors to produce the steering vector for forming the beam in the direction of the client after the eigen-decomposition is performed.

8. The system of claim 7 further comprising the wireless communication system using the recorded weighting factors to steer the energy of the beam.

9. The system of claim 5, further comprising the wireless communication system configured to computing an array pattern for eigenvector weights and searching for a signal peak as a function of angle.

10. The system of claim 5 wherein the wireless communication system is configured to building a complimentary projection operator from the computed eigenvector, wherein an incident angle is then found corresponding to the maximum distance from a subspace defined by the dominant eigenvector and an array manifold defined by the separations of antenna elements in the antenna array.

11. The system of claim 10 wherein the array manifold $a(\phi)$ is a vector used to generate a matrix $A(\phi)$ such that $A(\phi)=aa^H$ where $A(\phi)$ is a matrix that is a function of the angle of incidence $\phi$ and $a^H$ is the Hermitian vector of a, where the dominant eigenvector of the array manifold matrix A defines the subspace.

12. The system of claim 11, the wireless communication system is further configured to determine a projection operator P for A such that $P=AA^H$, which projects A onto a column space for the matrix A, and wherein the complimentary projection operator P is given as P'=IP where I is the identity matrix for A, wherein the complementary projection operation P' operates on the matrix $A(\phi)$ so as to create a projection of $A(\phi)$ in a direction perpendicular to the array manifold, so as to derive the incident angle of the client signal.

13. The system of claim 11 wherein the wireless communication system is configured to directing nulls and forming nulls by computing an integrated direct product of the array manifold over the angular range needed to control interference, such that:

$$D = \int_{\theta_1}^{\theta_2} AA^H \, d\varphi$$

where $\theta_1$ and $\theta_2$ represents the width of the null, further comprising a step of diagonalizing the matrix D and using the eigenvectors to form a complementary projection operator for the column space spanned of the original integrated matrix formed by the direct product of the array manifold, and comprising a further step of applying the complementary projection operator to the steering vector for the client to produce a new steering vector that produces a wide null in the array pattern of the desired position.

14. The system of claim 10 wherein the computed angle and the eigenvector corresponding to the dominant eigenvalue give a spatial signature for the at least one client, and the wireless communication system is responsive to saving these values to form the steering vectors and determine which clients can access the channel at the same time.

15. The system of claim 14, the wireless communication system further responsive to evaluating the spatial signatures to form nulls in the steering vectors, so that the nulls can be directed toward any nearby clients or other potentially interfering sources, wherein if two or more clients have adequate angular separation from the position of the antenna array as indicated by their spatial signatures, the wireless communication system is responsive to computing suitable array steering vectors for each client such that the computed steering vectors are used for both transmission and reception of messages from each respective client.

16. A system of wireless communication comprising:

means for exchanging wireless signals between at least one remote client and a directional antenna array associated with a wireless network, wherein the directional antenna array includes a plurality of antenna elements;

means for locating angles associated with directions of arrival for wireless signals from each client with respect to the antenna array;

means for determining values for weighting factors of wireless signals for each of the respective plurality of antenna elements, so as to create predetermined phase differences between the signals of the plurality of antenna elements, wherein the determining values for the weighting factors comprises sampling baseband signals from each antenna element, so as to obtain a representation of sampled signals from a particular client;

means for using the predetermined phase differences to direct at least one null toward at least one source of interference, so as to avoid signal interference;

wherein the sampled signals are used to build up a covariance matrix R; and wherein the sampled signals X have vector components $x_0, x_1, x_2 \ldots x_n$ that are expressed in matrix form such that $X=\{x_0\ x_1\ x_2 \ldots x_n\}$, and wherein the covariance matrix R is built up such that $R=XX^H$ where R is the direct product of X and $X^H$ is the Hermitian matrix of X.

17. A system for wireless communication comprising:

means for exchanging wireless signals between at least one remote client and a directional antenna array associated with a wireless network, wherein the directional antenna array includes a plurality of antenna elements;

means for locating angles associated with directions of arrival for wireless signals from each client with respect to the antenna array;

means for determining values for weighting factors of wireless signals for each of the respective plurality of antenna elements, so as to create predetermined phase differences between the signals of the plurality of antenna elements, wherein the determining values for the weighting factors comprises sampling baseband signals from each antenna element, so as to obtain a representation of sampled signals from a particular client, wherein the sampled signals are used to build up a covariance matrix R;

means for performing an eigen-decomposition upon the covariance matrix for determining the dominant eigenvalues and the corresponding eigenvectors of the matrix upon building up the covariance matrix of sampled values from the client signal; and means for using the predetermined phase differences to direct at least one null toward at least one source of interference, so as to avoid signal interference;

wherein the sampled signals X have vector components $x_0, x_1, x_2 \ldots x_n$ that are expressed in matrix form such that $X=\{x_0\ x_1\ x_2 \ldots x_n\}$, and wherein the covariance matrix R is built up such that $R=XX^H$ where R is the direct product of X, and $X^H$ is the Hermitian matrix of X.

* * * * *